United States Patent [19]
Gardner

[11] Patent Number: 5,993,936
[45] Date of Patent: Nov. 30, 1999

[54] ANTI-SLIP DEVICE AND METHOD

[75] Inventor: Timothy Gardner, Goodview, Va.

[73] Assignee: NSW Corporation, Roanoke, Va.

[21] Appl. No.: 08/928,940

[22] Filed: Sep. 12, 1997

[51] Int. Cl.⁶ .................................................. B32B 3/24
[52] U.S. Cl. ..................... 428/131; 428/137; 428/138; 428/140; 428/167; 428/343; 428/355; 428/349; 428/139; 442/32; 442/36; 442/38
[58] Field of Search .................................. 428/131, 137, 428/138, 139, 140, 167, 343, 355, 349; 442/32, 36, 38

[56] References Cited

U.S. PATENT DOCUMENTS

| | | | |
|---|---|---|---|
| 4,266,593 | 5/1981 | Hayashi | 152/218 |
| 4,397,246 | 8/1983 | Ishida et al. | 108/55.3 |
| 4,421,805 | 12/1983 | Prader | 428/35 |
| 4,507,348 | 3/1985 | Nagata et al. | 428/172 |
| 4,656,075 | 4/1987 | Mudge | 428/110 |
| 5,028,479 | 7/1991 | Pinchuk et al. | 428/310.5 |
| 5,153,075 | 10/1992 | Havens et al. | 428/516 |
| 5,308,690 | 5/1994 | Butcher, Jr. | 428/256 |
| 5,597,194 | 1/1997 | Daugherty et al. | 296/39.2 |
| 5,845,588 | 12/1998 | Gronnevik | 108/57.27 |

*Primary Examiner*—William P. Watkins, III
*Attorney, Agent, or Firm*—Mark H. Jay

[57] ABSTRACT

An anti-slip separator sheet that increases friction and reduces slippage when handling, storing and shipping goods and packages. The sheet is preferably a plastic net with polymer beads protruding from the top and bottom surfaces of the net. The polymer beads are preferably secured to the net by bonding the polymer beads to each other in the openings of the net. The polymer beads protrude from the surfaces of the net, increasing the coefficient of friction. The anti-slip net is used between goods and packages to reduce slippage.

39 Claims, 5 Drawing Sheets

ANTI-SLIP DEVICE AND METHOD

FIELD OF INVENTION

This invention relates generally to plastic separator sheets for transporting, storing, stacking, handling, etc. of packages, and, more particularly, anti-slip separator sheets that increase friction and reduce the shifting and slipping of the packages.

BACKGROUND OF INVENTION

Many companies handle, store and ship goods. In many instances, to take advantage of economies, goods are handled, stored and shipped in bulk, which results in the stacking and packaging of the goods. For example, it is common to package goods and then stack the packages on a pallet so that the goods can be maneuvered by a forklift truck or the like. These loaded pallets are in turn stored and stacked, and are shipped both short and long distances via trucks, trains, sea, air, etc.

Accordingly, the packages are subjected to forces that cause them to shift and slip against each other and/or the pallet. This causes damage to the packages and the goods they contain.

In an attempt to reduce such damage, companies often create customized packaging for the goods. For example, companies can incorporate additional padding within the packaging, create form-fitting packages, use tie-bands or wraps, etc. However, customized packaging results in added complexities, time, weight and cost. In other instances companies have used cardboard as separator sheets between the packages and/or pallets in an attempt to increase padding an increase friction. Cardboard, however, is bulky and expensive and doe., not significantly increase friction.

In addition, many companies store and ship goods that have metal parts that are particularly susceptible to denting and damage during handling, and are also susceptible to rust or corrosion. In an attempt to reduce such corrosion, some companies use costly and cumbersome sealants or wraps and the like.

Consequently, it is desirable to provide a durable, lightweight and inexpensive anti-slip separator sheet for handling, storing and packaging goods. It is also desirable to provide a durable, lightweight and inexpensive anti-slip separator sheet for metal goods that reduces corrosion and prolongs the life of the goods.

SUMMARY OF INVENTION.

The present invention uses a plastic anti-slip separator sheet that can be placed, for example, between goods, packages, support surfaces, and the like. The separator sheet is preferably a plastic substrate in the form of a net or film. An anti-slip polymer bead-line is applied or bonded to the upper and lower surfaces of the substrate so that polymer bead lines protrude from its surfaces. The anti-slip separator sheet can then be placed between packages, goods and support surfaces. Since the polymer beads are raised from the surfaces of the substrate, they form protrusions or ridges that increase friction, while also increasing padding. The ridges prevent any packages that are placed on the anti-slip sheets from sliding and moving during handling and shipping.

In addition, the sheet substrate is preferably comprised of a highdensity polymer, such as a high density polyethylene, For strength and rigidity. The applied polymer beads are preferably comprised of a tacky lower density material, and, preferably, comprised of an anti-slip material, such as ethyl vinyl acetate or a thermo plastic rubber. This will further increase the anti-slip sheet's coefficient of friction, thereby further reducing slipping and shifting of the packages.

Moreover, additives can be applied to the polymer bead, such as color, anti-static agents, vapor corrosive inhibitors, and the like. Such additives can further enhance the utility of the separator sheet.

Alternatively, the anti-slip polymer beads can be applied to only one surface of the sheet. Since the bead line will protrude from one surface of the sheet, the beads will increase the coefficient of friction of the sheet and provide a anti-slip surface. The sheet can then be placed between packages, support surfaces and goods, increasing the friction between the packages, surfaces and goods. This reduces the slippage of the packages or goods, which, in turn, reduces damage to the goods.

Alternatively, the anti-slip polymer beads can be applied directly to a support surface, such as a pallet, a tray, work surface, etc. A polymer bead will thus protrude from the support surface, thereby providing friction ridges that extend from the surface, and, if the polymer beads are comprised of an anti-slip material, they will provide further friction reduction. Thus, any parts or products that are placed on such a support surface will be hampered from slipping.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principals of the invention.

DETAILED DESCRIPTION OF THE PREFERRED EMBODIMENT

Figure 1:
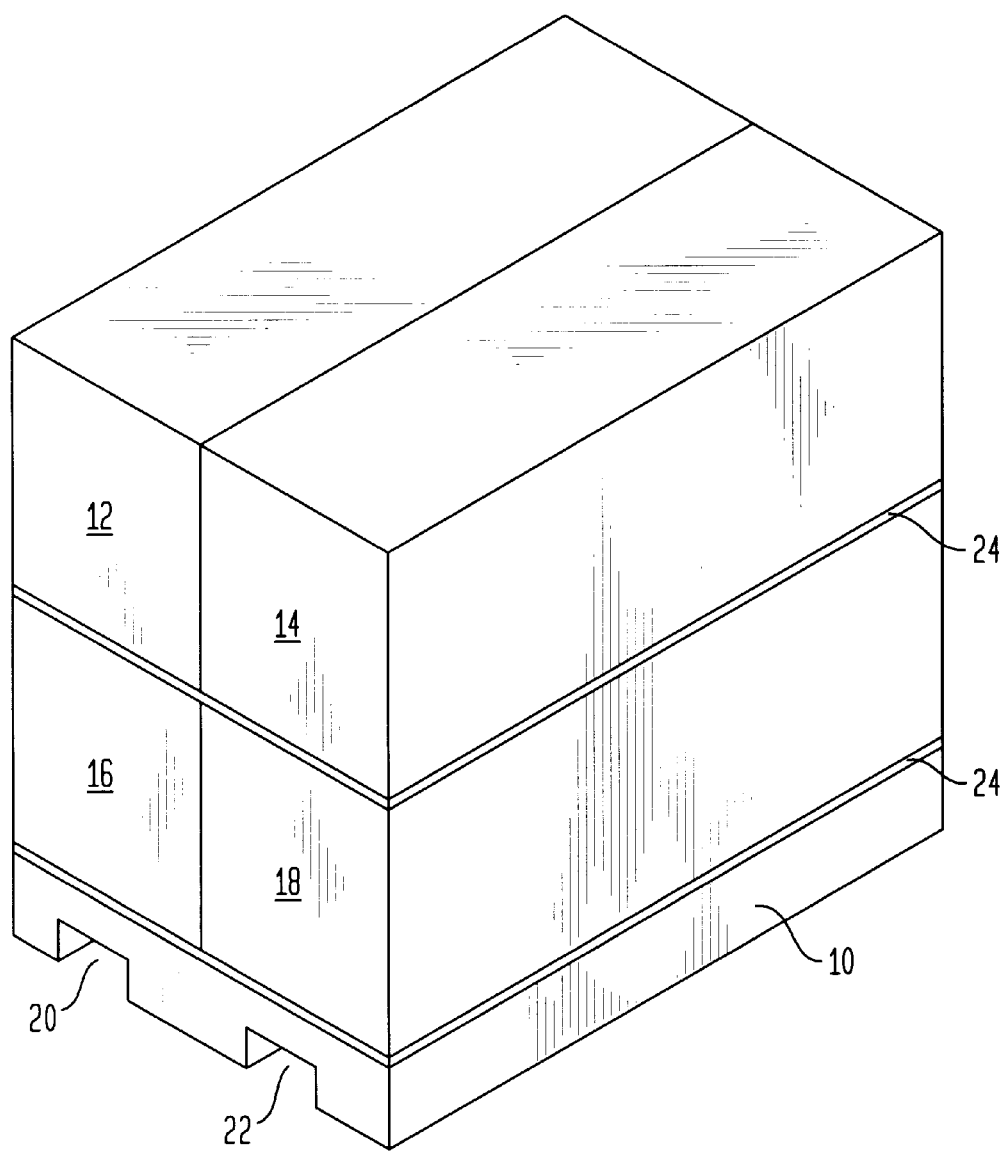
FIG. 1 is a perspective view of a loaded pallet with anti-slip separator sheets in accordance with an embodiment of the present invention.

Referring to FIG. 1, a pallet 10 is shown supporting four packages 12, 14, 16 and 18. Of course, the depiction of four packages is arbitrary, and the pallet 10 can support any number of packages.

The packages 12, 14, 16 and 18, for example, can be comprised of cardboard, paper, plastic, metal or the like that contain parts or goods. Alternatively, the packages can themselves be parts car goods stacked on the pallet 10.

The pallet 10 has inserts 20 and 22 so that a traditional forklift truck can insert its forks under the pallet and lift and move the pallet 10 and packages 12, 14, 16 and 18. Loaded pallets like pallet 10 are often stored, shipped and stacked, subjecting the loaded packages to substantial moving forces. This may cause the packages to move and slip against each other or against nearby items, which may damage the packages or goods.

To prevent this slippage, an anti-slip separator sheet 24 in accordance with the present invention is inserted between the pallet 10 and packages 16 and 18. Similarly, an anti-slip separator sheet 24 is Eilso inserted on top of packages 16 and 18 below packages 12 and 14. As described below, these anti-slip separator sheets 24 increase friction and prevent the packages 12, 14, 16 and 18 from slipping.

Figure 2:
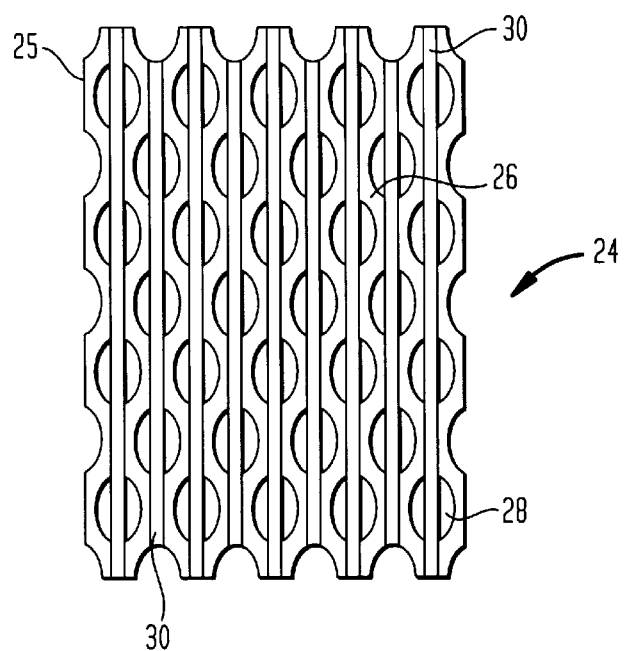
FIG. 2 is a top view of an anti-slip sheet in the form of a net in accordance with an embodiment of the present invention.

Turning to FIG. 2, a top view of one embodiment of an anti-slip separator sheet 24 in accordance with the present invention is shown. In this embodiment, the sheet 24 is in the form of a net substrate 25 comprised of plastic strands 26 with openings 28 in between. The ret substrate 25 may be constructed pursuant to any method known in art, such as by extrusion.

Preferably, the net substrate 25 is made of a high-density polymer, such as polyethylene, having a density, for example, between 0.92 and 0.94 g./cc. This provides a substrate 25 having sufficient strength and rigidity that can withstand the weight of heavy packages while maintaining a separator function that prevents the packages from contacting each other or the supporting surface. Moreover, a high density polymer substrate 25 is durable yet lightweight and inexpensive.

As shown in FIG. 2, polymer bead lines 30 are shown in parallel lines on the top surface of the net substrate 25. A portion of the bead lines 30 cross a portion of the openings 28. Of course, as persons skilled in the art will appreciate, the polymer bead lines 30 can be applied in any fashion, such as in partial parallel lines, diagonal lines, partial lines, curves, squiggles, and the like.

Figure 3:
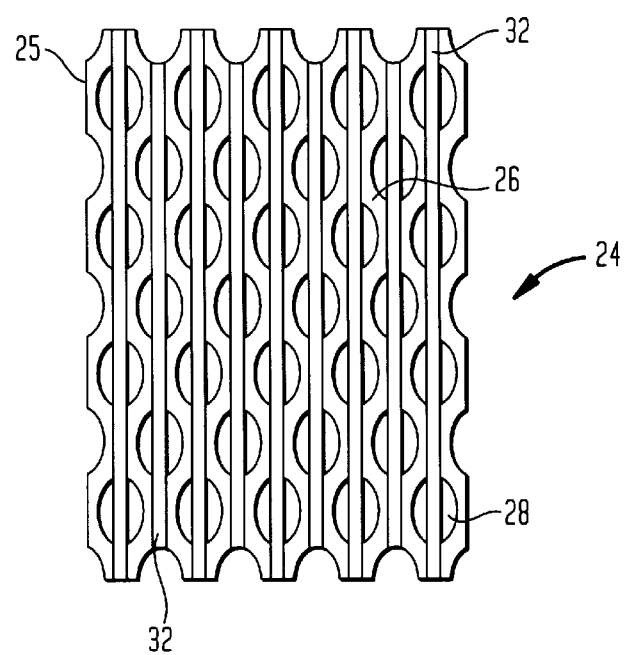
FIG. 3 is a bottom view of the anti-slip sheet shown in FIG. 2.
Figure 4:
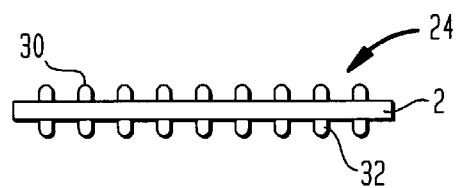
FIG. 4 is a side view of the anti-slip sheet shown in FIGS. 2 and 3.

Turning to FIG. 3, a bottom view of the anti-slip separator sheet 24 is shown. Polymer bead lines 32 are shown in parallel lines on the bottom surface of the net substrate 25 across the openings 28. Preferably, the upper bead lines 30 and the lower bead lines 32 are place on the net 25 so that they overlap each other in the openings 28. Thus, as shown in FIGS. 2 and 3, the bead lines 30 and 32 are in substantially the same location on the upper and bottom surfaces of the net 25. This is best depicted in FIG. 4, which is a side-view of the net 25.

Preferably, the polymer beads 30 and 32 comprise a tacky, anti-slip substance, such as ethyl vinyl acetate. Ethyl vinyl acetate is available from a variety of chemical companies, including Exxon at P.C. Box 3272, Houston, Tex. 77253 as material LD722.62. Preferably, the polymer beads are composed of about 22 percent pure ethyl vinyl acetate and about 78 percent low density polyethylene. Of course, the ethyl vinyl acetate can be mixed at other percentages, and can also be mixed with other polymers, such as polypropylene, polyester, polyethylene terepthalate, and the like. The cross-sectional shape of the bead configurations can be round, square, oval, polygonal, or the like, and the bead thickness and distance between adjacent beads can be varied as known in the art.

Alternatively, the polymer beads 30 and 32 may comprise a thermo plastic rubber, a low density polymer, or the like. These substances will also increase the friction of the anti-slip sheet 24, as discussed further below.

Figure 5:
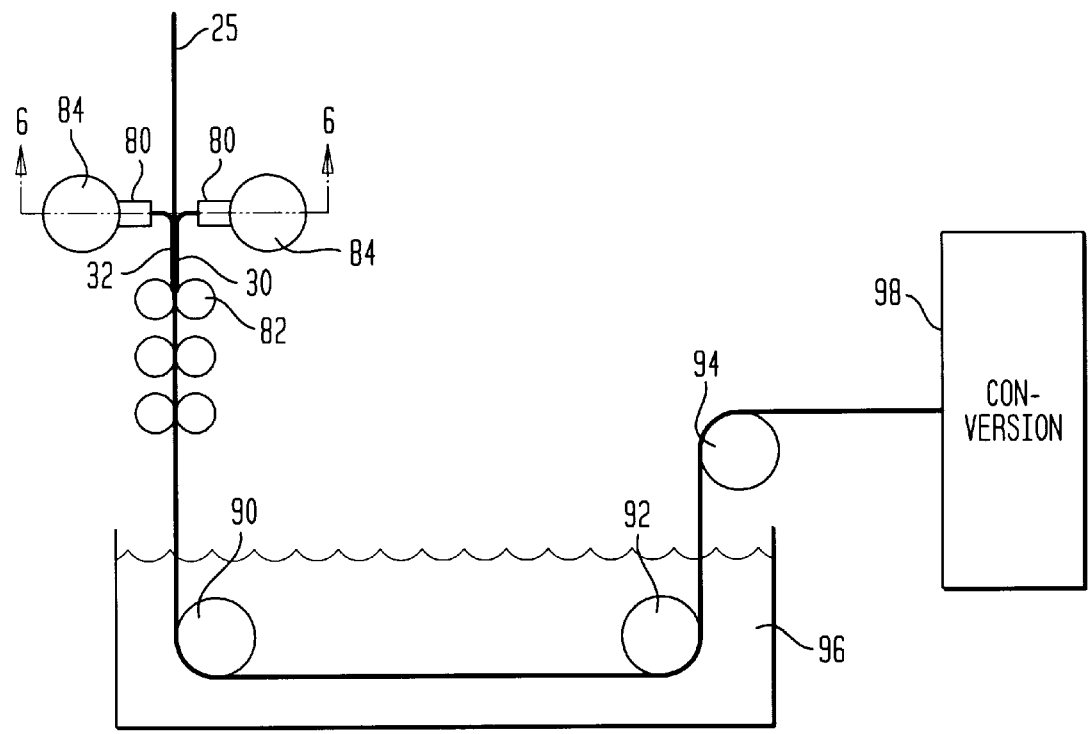
FIG. 5 is a side view showing an aspect of the manufacturing process for the anti-slip sheet shown in FIGS. 2, 3 and 4.
Figure 6:
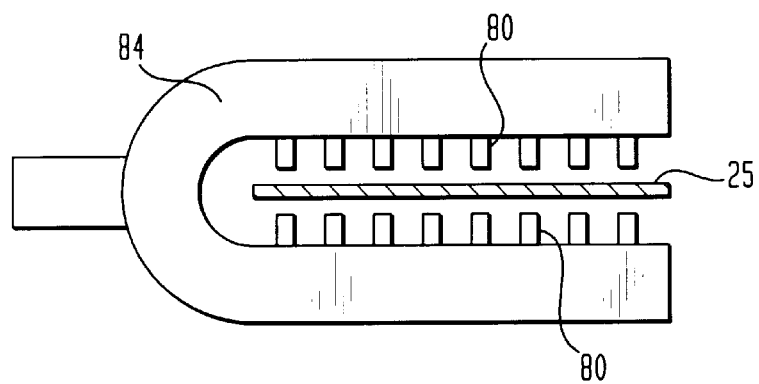
FIG. 6 is a cross-sectional view along the line A—A of FIG. 5.

FIG. 5 illustrates the production process in a schematic side view for applying and bonding the polymer beads 30 and 32 to the net substrate 25. The net 25 is pulled between a series of nozzles 80 by a calendar roll stack 82. As illustrated in FIGS. 5 and 6, an extrusion barrel 84 provides molten polymer to the nozzles 80. The nozzles 80 apply the polymer bead lines 30 and 32 in a molten state to the upper and lower surfaces of the net 25. The net 25 with the molten bead lines 30 and 32 applied thereto are then pulled between the calendar roll stack 82. The stack 82 applies pressure to the bead lines 30 and 32, thereby pressing them towards each other and the net 25. This causes the molten bead lines 30 and 32 to contact each other in the openings 28 of the net 25.

The net 25 with bead lines 30 and 32 are then moved around drums 90, 92 and 94 through a quench tank 96. The calendar roll stack 82 also quenches the net 25 and bead lines 30 and 32. This quenching causes the molten bead lines 30 and 32 to cool and become thermally bonded to each other in the openings 28. The bead lines 30 and 32 are thus physically attached to each other in the openings 28 of the net 25, which causes the bead lines 30 and 32 to become physically enmeshed with and secured to the net 25.

The net 25 and bead lines 30 and 32 are then sent through a conversion process 98, as known in the art.

The efficient and inexpensive process shown in FIGS. 5 and 6 provides an anti-slip sheet 24 with polymer bead lines 30 and 32 physically and durably attached thereto. Thus, an inexpensive, lightweight, strong and durable anti-slip sheet 24 is achieved.

Alternatively, the molten polymer beads 30 arid 32 can be applied to the net substrate 25 at a temperature which will cause thermal bonding with the plastic strands 26 of the net 25 at the areas where the strands contact the polymer beads 30 and 32. Consequently, the polymer beads 30 and 32 will thermally bond directly to the net 25 at these molt points. This process can be used stand-alone, without the pressing of the bead lines together via the calendar roll stack 82. In this case, the polymer beads 30 and 32 are bonded and held to the net 25 by the thermal bonding of the polymer beads 30 and 32 directly to the net 25.

Alternatively, the bead lines 30 and 32 can be bonded to the plastic strands 26 of the net 25 in addition to the bonding of the bead lines 30 and 32 in the openings 28 of the net 25. This will provide a stronger and more durable bonding of the polymer beads 30 and 32 to the net 25, thereby increasing the durability of the anti-slip sheet 24.

Of course, persons skilled in the art will appreciate that the polymer beads 30 and 32 can be bonded to the net substrate 25 in a variety of ways, including lamination, co-extrusion with the net, heat guns, etc.

Figure 7:
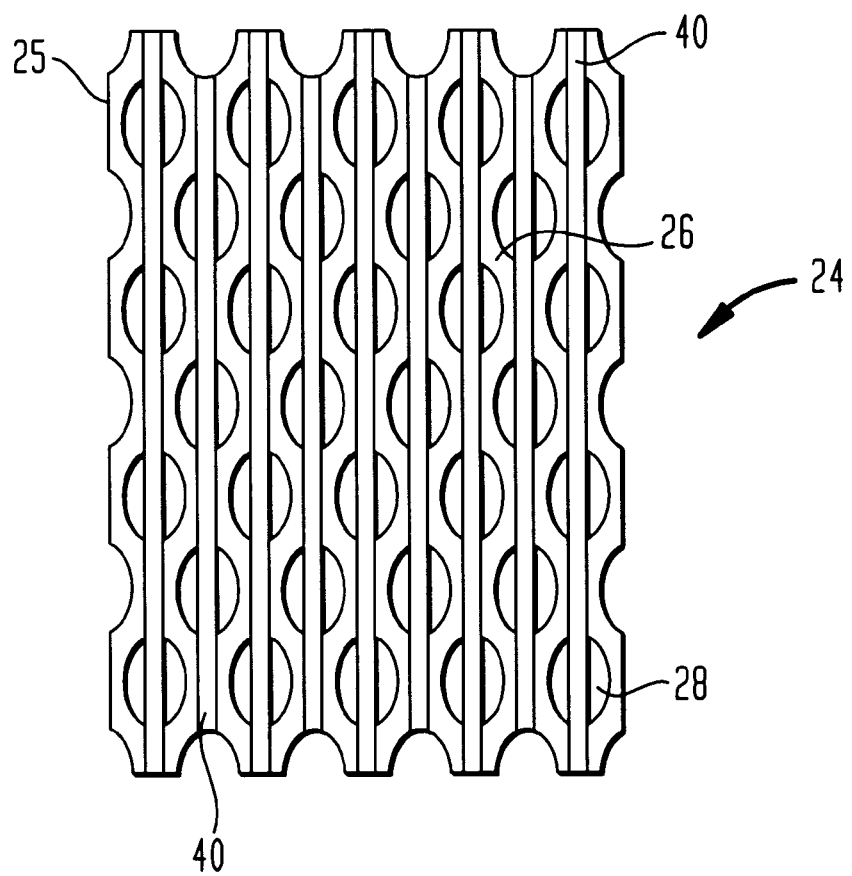
FIG. 7 is a top view of an alternative embodiment of an anti-slip sheet.
Figure 8:
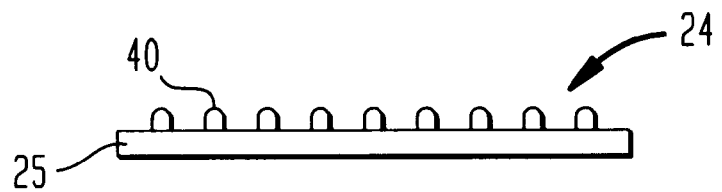
FIG. 8 is a side view of the anti-slip sheet shown in FIG. 7.

FIGS. 7 and 8 show an alternative embodiment of an anti-slip separator sheet 24. More particularly, FIG. 7 shows an upper view of the anti-slip separator sheet 24 in the form of a net substrate 25 with polymer bead lines 40 applied across the upper surface of the net. FIG. 8 shows a side view of this anti-slip separator sheet 24. The polymer beads 40 are shown bonded to the upper surface of the net 25. The polymer beads 40 can be bonded to the upper surface of the net via lamination, heat gun, coextrusion with the net 25, or the like. Like the anti-slip separator sheet 24 shown in FIGS. 2, 3 and 4, the polymer beads 40 are preferably comprised of a tacky, low density, non-slip substance, such as ethyl vinyl acetate or a thermo plastic rubber.

Figure 9:
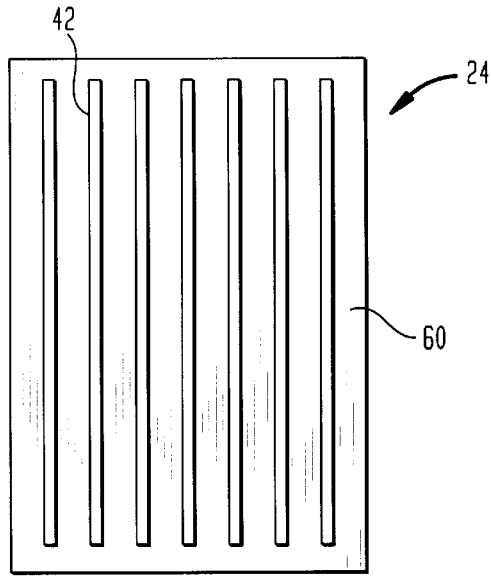
FIG. 9 is a top view of an alternative embodiment of an anti-slip sheet.
Figure 10:
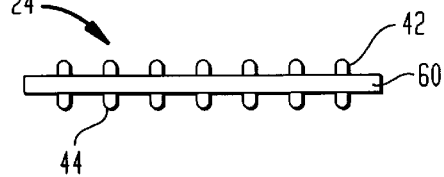
FIG. 10 is a side view of the anti-slip sheet shown in FIG. 9.

Turning to FIG. 9, an alternative embodiment of the anti-slip separator sheet 24 is illustrated. In this embodiment, the separator sheet 24 has a flat sheet substrate 60, which is preferably a thin plastic film, but, as persons skilled in the art will appreciate, it could also be paper, cardboard, wood, metal, composite, etc. The flat sheet substrate embodiment illustrated in FIG. 9 is otherwise similar to the net substrate embodiment shown in FIGS. 2, 3 and 4. Specifically, as shown in FIG. 10, which is a side view of the anti-slip sheet 24 having a flat sheet substrate 60, polymer beads 42 and 44 are shown bonded to and protruding from the upper and lower surfaces of the sheet 60. The polymer beads 42 and 44 provide ridges on the flat sheet 60 that increase friction.

Figure 11:
FIG. 11 is a side view of an alternative embodiment of the anti-slip sheet shown in FIG. 9.

Alternatively, the polymer beads can be bonded to one surface of the flat sheet. This is illustrated in FIG. 11, which is a side view of flat sheet substrate 60 with polymer beads 46 bonded to and protruding from the upper surface of the sheet 60. This provides friction ridges on the upper surface of the flat sheet 60, thereby increasing the coefficient of friction of the anti-slip sheet 24.

Again, the polymer beads 46 may be bonded to the flat sheet substrate 60 during the manufacturing process of the sheet, such as extruded concurrently with the sheet 60, or during a separate or secondary process, such as by lamination or a heat gun. These processes provide polymer beads 46 that protrude from the surface of the flat sheet 60, thus presenting a ridge that increases the friction on the surface of the flat sheet 60.

The preferred uses of the anti-slip separator sheet 24 of the present invention will now be discussed.

As shown in FIG. 1, the anti-slip separator sheets 24 can be placed on a pallet 10 below packages 16 and 18, or between packages 16 and 18 and 12 and 14. The separator sheets thus are in contact with the packages and support the weight of the packages that are stacked up on them. Consequently, the separator sheets 24 present a coefficient of friction to the packages. As explained above, polymer beads protrude from one or both surfaces of the separator sheets 24. These protrusions significantly increase the coefficient of friction of the separator sheet. This coefficient of friction is further increased if the polymer beads comprise an anti-slip substance, such as ethyl vinyl acetate.

Consequently, when the loaded pallet 10 is moved, stacked, shipped, or the like, the increased friction of the separator sheets 24 reduces the sliding and slipping of the packages 12 to 17. This, in turn, reduces damage to the packages and thereby reduces the cost of handling, storing and transporting the packages. Moreover, since the separator sheets are preferably made out of inexpensive, lightweight and compact plastic nets or films, the cost of using such separator sheets is minimal.

Of course, as persons skilled in the art will recognize, the separator sheets 24 can be used in many applications when stacking, storing, handling or shipping objects (in addition to the disclosed pallet method). Thus, such separator sheets 24 can be used on any surfaces, such as shelving, truck beds, railroad cars, workstations, tables, floors, washing machines, or the like, which would result in an increase of the friction on the surface and an anti-slip surface. Consequently, any packages, parts, tools, crates, or the like, that were placed on such surfaces would therefore be less likely to slip or slide.

Since the anti-slip sheet 24 of the present invention is preferably made of plastic, it can be used in wet or humid areas without degradation to the sheet. Most often, these wet and humid areas present particularly slippery surface areas, such as a washing machine for goods and parts. The anti-slip sheets 24 of the present invention provide an inexpensive and efficient solution to keeping such goods and parts from sliding into themselves and walls when being washed in such machines.

Moreover, the separator sheets 24 of the present invention can be easily manufactured to be flexible so that they can be used like traditional package wrap to bind together or hold parts and packages. The present invention, however, has added utility beyond a traditional wrap because the protruding polymer beads provide a shock-absorbing function. The flexible and soft polymer beads absorb some of the shocks associated with the incidental contact that occurs during handling, similar to traditional bubble wrap. Thus, the separator sheets 24 provide features of both traditional wrap and bubble wrap, at a fraction of the cost, weight and bulk of bubble wrap.

In addition, if the separator sheets 24 or the polymer beads are impregnated with a volatile corrosion inhibitor, the separator sheet 24 of the present invention also provides corrosion-reducing benefits. Thus, metal parts or packages that are wrapped in or placed on such a sheet 24 can be stored and shipped with a significant reduction in corrosion. Moreover, if the sheet 24 is in the form of a flat sheet, as depicted in FIG. 5 for example, it may be, in itself, moisture resistant (as would be the case if it were made of the preferred plastic film), the sheet 24 would provide additional corrosive-reducing benefits.

Also, the substrate or polymer beads of the anti-slip sheet 24 of the present invention can be easily impregnated with other agents, such as antistatic electricity agents. Thus, parts and goods that are subject to damage from static electricity can be protected by placing them on or wrapping them in the anti-slip sheets 24 of the present invention impregnated with anti-static agents.

Similarly, the substrate or polymer beads of the, anti-slip sheet 24 of the present invention can be easily impregnated with other agents, such as colors or odors.

Figure 12:
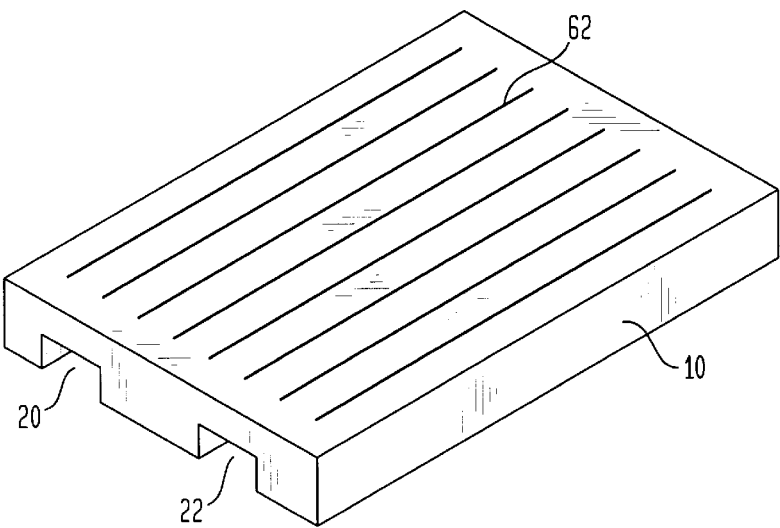
FIG. 12 is a perspective view of a pallet having an anti-slip support surface in accordance with an embodiment of the present invention.

Turning now to FIG. 12, an alternative embodiment of the present invention is shown. Specifically, it is shown that polymer beads 62 can be applied directly to a support surface rather than a separator sheet. As shown in FIG. 12, the polymer beads 62 are bonded to the upper surface of a pallet 10. The pallet 10 can be made from wood, plastic, composite, or the like. Where appropriate, the polymer beads can be bonded via extrusion concurrently with the extrusion of the pallet 10. Or, the polymer beads 62 can be applied directly to the surface of the pallet via a hot melt gun, lamination, pressure sensitive adhesive, bonding, or the like.

The support surface of pallet 10 would therefore have polymer beads 62 protruding from its support surface. These protrusions act as ridges that increase the coefficient of friction of the support surface. In addition, since the polymer beads 62 are preferably made from an anti-slip substance, such as ethyl vinyl acetate, the coefficient of friction is further increased.

Consequently, by applying polymer beads 62 to a standard pallet 10, the pallet's surface is made anti-slip. Any packages or parts that are then placed on the pallet 10 will therefore be prevented from slipping and sliding, thereby reducing damage to the packages or parts.

Of course, as persons skilled in the art will appreciate, anti-slip polymer beads can be applied to any support surface to increase its friction, in addition to the disclosed pallet 10 of FIG. 12. Thus, anti-slip polymer beads can be applied directly to shelving, truck beds, railroad cars, packaging, flooring, work stations, conveyor belts, or the like. Moreover, polymer beads can be easily bonded to a variety of surface types, such as wood, paper, cardboard, metal, glass, ceramic, plastic, composites, or the like, resulting in increased surface friction of these surfaces. Thus, any existing support surfaces can be made into an anti-slip surface by bonding polymer beads to the surface. Alternatively, during the manufacturing process of the support, the polymer beads can be bonded thereto, such as through extrusion or lamination, thus resulting in an anti-slip surface.

Accordingly, many variations of the present invention can be practiced without deviating from the spirit and scope of the present invention.

What is claimed is:

1. An anti-slip device comprising:
    a net having top and bottom surface portions including a plurality of plastic strands interconnected to provide at least one gap between at least two of the plurality of plastic strands;
    a first anti-slide polymer bead protruding from the top surface portion of said net;
    a second anti-slip polymer bead protruding from the bottom surface portion of said net; and
    said first anti-slip polymer bead secured to said second anti-slip polymer bead within said at least one gap.

2. The device of claim 1 wherein said first polymer bead is secured to said second polymer bead by bonding.

3. The device of claim 2 wherein said first polymer bead is secured to said second polymer bead by thermal bonding.

4. The device of claim 1 wherein at least one of said polymer beads is bonded to the plastic strands of the net.

5. The device of claim 4 wherein at least one of said polymer beads is thermally bonded to the plastic strands of the net.

6. The device of claim 1 further comprising:
    means comprising a support surface where the net is adjacent the support surface.

7. The device of claim 6 wherein said means comprising a support surface is a pallet.

8. The device of claim 1 wherein said net is comprised of a high density polymer.

9. The device of claim 8 wherein said density of said polymer is between 0.92 and 0.94.

10. The device of claim 1 wherein at least one of seed polymer beads comprises ethyl vinyl acetate.

11. The device of claim 10 wherein said polymer beads are made from a combination of ethyl vinyl acetate and at least one polymer.

12. The device of claim 10 wherein said polymer bead comprises about 20 to 30 percent ethyl vinyl acetate.

13. The device of claim 1 wherein at least one of said polymer beads comprises a thermo plastic rubber.

14. The device of claim 8 wherein at least one of said polymer beads comprises ethyl vinyl acetate.

15. The device of claim 14 wherein at least one of said polymer beads are made from a combination of ethyl vinyl acetate and at least one polymer.

16. The device of claim 14 wherein said polymer bead comprises about 20 to 30 percent ethyl vinyl acetate.

17. The device of claim 8 wherein at least one of said polymer beads comprises a thermo plastic rubber.

18. The device of claim 14 wherein said first polymer bead is secured to said second polymer bead by thermal bonding.

19. The device of claim 14 wherein at least one of said polymer beads are bonded to the plastic strands of the net.

20. The device of claim 19, wherein at least one of said polymer beads are thermally bonded to the plastic strands of the net.

21. The device of claim 1 wherein said plastic strands of said net comprise a corrosion inhibitor.

22. The device of claim 1 wherein at least one of said polymer beads comprises a corrosion inhibitor.

23. The device of claim 1 wherein said plastic strands of said net comprise a static inhibitor.

24. The device of claim 18 wherein at least one of said polymer beads comprises a corrosion inhibitor.

25. An anti-slip plastic sheet comprising:
    a high density plastic substrate having top and bottom surface portions and at least one opening therein;
    a first anti-slip, low-density polymer bead protruding from the top surface portion of said substrate;
    a second anti-slip, polymer bead protruding from the bottom surface portion of said substrate; and
    said first and second anti-slip polymer beads secured to each other through at least one opening in said substrate.

26. The sheet of claim 25 wherein said substrate comprises plastic strands interconnected in the form of a mesh with at least one opening between the strands.

27. The sheet of claim 25 wherein at least one of said polymer beads comprises ethyl vinyl acetate.

28. The sheet of claim 26 wherein at least one of said polymer beads comprises ethyl vinyl acetate.

29. The sheet of claim 26 wherein the first and second polymer beads are secured to said substrate by bonding a portion of said first polymer bead to a portion of said second polymer bead within said at least one opening.

30. The sheet of claim 29 wherein the first and second polymer beads are secured to said substrate by thermally bonding a portion of said first polymer bead to a portion of said second polymer bead within said at least one opening.

31. The sheet of claim 30 wherein at least one of said polymer beads is thermally bonded to the substrate.

32. The sheet of claim 25 wherein at least one of said polymer beads is thermally bonded to the substrate.

33. The sheet of claim 28 wherein at least one of said polymer beads is made of between 20 and 30 percent ethyl vinyl acetate.

34. An anti-slip separator sheet comprising:
    a sheet substrate comprised of a high density polymer having top and bottom surfaces and at least one opening therein;
    a first series of tacky, low density polymer anti-slip beads secured to the substrate and protruding from the top surface of the substrate; and
    a second series of tacky, low density polymer anti-slip beads secured to the substrate and protruding from the bottom surface of the substrate;
    where the first and second series of beads are connected to each other through at least one opening in the substrate.

35. The sheet of claim 34 wherein said sheet substrate or the polymer beads are comprised of a vapor corrosive inhibitor.

36. The sheet of claim 34 wherein said sheet substrate is comprised of plastic strands interconnected in the form of a mesh with at least one opening between the strands.

37. The sheet of claim 36 wherein said first polymer bead is secured to said second polymer bead within said at least one opening by thermally bonding said first polymer bead to said second polymer bead.

38. The sheet of claim 37 wherein said sheet substrate or said polymer beads comprise an vapor corrosive inhibitor.

39. The sheet of claim 38 wherein said sheet substrate or said polymer beads comprise an anti static agent.

* * * * *